(12) United States Patent  (10) Patent No.: US 8,854,463 B2
Imamura  (45) Date of Patent: Oct. 7, 2014

(54) METHOD AND APPARATUS FOR GENERATING A BIRD'S-EYE VIEW IMAGE

(75) Inventor: Kosuke Imamura, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1622 days.

(21) Appl. No.: 12/260,749

(22) Filed: Oct. 29, 2008

(65) Prior Publication Data

US 2009/0122140 A1    May 14, 2009

(30) Foreign Application Priority Data

Nov. 9, 2007  (JP) ................................. 2007-292223

(51) Int. Cl.
  *H04N 7/18*  (2006.01)
  *H04N 7/00*  (2011.01)
  *B60Q 9/00*  (2006.01)
  *G06T 7/00*  (2006.01)

(52) U.S. Cl.
  CPC ........... *B60Q 9/005* (2013.01); *B60R 2300/607* (2013.01); *G06T 7/0044* (2013.01)
  USPC ............................ 348/148; 348/118; 382/106

(58) Field of Classification Search
  CPC . B60R 2300/607; B60Q 9/005; G06T 7/0044
  USPC .................... 348/148, 118; 382/106
  See application file for complete search history.

(56) References Cited

U.S. PATENT DOCUMENTS

| | | | |
|---|---|---|---|
| 6,911,997 B1 * | 6/2005 | Okamoto et al. ............. | 348/148 |
| 7,161,616 B1 * | 1/2007 | Okamoto et al. ............. | 348/148 |
| 7,741,961 B1 * | 6/2010 | Rafii et al. ..................... | 340/435 |
| 2003/0021490 A1 * | 1/2003 | Okamoto et al. ............. | 382/284 |
| 2003/0063774 A1 * | 4/2003 | Oizumi ......................... | 382/104 |
| 2003/0076414 A1 * | 4/2003 | Sato et al. ..................... | 348/148 |
| 2003/0179293 A1 * | 9/2003 | Oizumi ......................... | 348/148 |
| 2004/0032321 A1 * | 2/2004 | McMahon et al. ......... | 340/425.5 |
| 2005/0200700 A1 * | 9/2005 | Schofield et al. ............. | 348/148 |

(Continued)

FOREIGN PATENT DOCUMENTS

EP    1179958 A1    2/2002
EP    1699242 A2    9/2006

(Continued)

OTHER PUBLICATIONS

English Translation of JP 2007-043318 (A).*

(Continued)

*Primary Examiner* — Rupal Dharia
*Assistant Examiner* — Wing Ma
(74) *Attorney, Agent, or Firm* — Brinks Gilson & Lione

(57) ABSTRACT

An obstacle detecting unit detects whether an obstacle exists in an area surrounding a vehicle in the direction a camera installed on the vehicle is pointed. If the obstacle is determined to have a portion at a predetermined height above a road surface with which the vehicle may make initial contact when the vehicle moves toward the obstacle, a virtual projection surface is set to the height of the predicted contact portion and viewpoint conversion processing is performed so as to project pixels of an image captured by the camera onto the virtual projection plane. In this way, the height of the projection plane and the height of the predicted contact portion match each other and the distance between the predicted contact portion and the vehicle is accurately expressed on a bird's-eye view image resulting from the viewpoint conversion.

17 Claims, 9 Drawing Sheets

(56) References Cited

U.S. PATENT DOCUMENTS

| | | | |
|---|---|---|---|
| 2005/0231341 A1* | 10/2005 | Shimizu | 340/436 |
| 2006/0197761 A1 | 9/2006 | Suzuki et al. | |
| 2006/0274147 A1* | 12/2006 | Chinomi et al. | 348/118 |
| 2006/0287826 A1* | 12/2006 | Shimizu et al. | 701/216 |
| 2007/0003108 A1* | 1/2007 | Chinomi et al. | 382/104 |
| 2007/0147664 A1* | 6/2007 | Kubota et al. | 382/106 |
| 2007/0299572 A1* | 12/2007 | Okamoto et al. | 701/28 |

FOREIGN PATENT DOCUMENTS

| | | |
|---|---|---|
| EP | 1725035 A1 | 11/2006 |
| EP | 1731366 A1 | 12/2006 |
| EP | 2058762 | 7/2008 |
| JP | 3300334 | 4/2002 |
| JP | 2007043318 A * | 2/2007 ............... H04N 7/18 |

OTHER PUBLICATIONS

Bertozzi, Massimo et al., "Artificial Vision in Road Vehicles," Proceedings of the IEEE, vol. 90, No. 7, Jul. 2002, pp. 1258-1271.

Fukatsu, Shinji et al., "Intuitive Control of 'Bird's Eye' Overview Images for Navigation in an Enormous Virtual Environment," ACM I-58113-019-8/98/0011, Graduate School of Engineering, Osaka University, Taipei, Taiwan, Nov. 2-5, 1998, pp. 67-76.

Extended European Search Report for European Application No. 08161318.4, dated Aug. 19, 2010, 6 pages.

EPO Response dated Dec. 23, 2010.

EPO Communication dated Nov. 7, 2011.

* cited by examiner

| HEIGHT (cm) | MOVEMENT-ALLOWED DISTANCE (cm) |
|---|---|
| 10 | 50 |
| 20 | 30 |
| 30 | 0 |
| 40 | 0 |
| 50 | 0 |

METHOD AND APPARATUS FOR GENERATING A BIRD'S-EYE VIEW IMAGE

BACKGROUND OF THE INVENTION

1. Related Application

The present application claims priority to Japanese Patent Application Number 2007-292223, filed Nov. 9, 2007, the entirety of which is hereby incorporated by reference.

2. Field of the Invention

The present invention relates to methods and apparatuses for generating bird's-eye view images. More specifically, the present invention relates to a method and an apparatus for generating a bird's-eye view image, as viewed from a virtual viewpoint above a vehicle, by performing viewpoint conversion processing on an image of the surroundings of a vehicle photographed by a camera.

3. Description of the Related Art

Conventional technology exists that captures images of surroundings of a vehicle by using multiple cameras installed at the front, rear, left, and right portions of the vehicle. Viewpoint conversion processing may be performed on the captured images in order to generate a bird's-eye image as viewed from a virtual viewpoint above the vehicle (this bird's eye image will hereinafter be referred to as a "vehicle-surroundings bird's-eye image"). The generated bird's-eye view image of the vehicle's surroundings may then be displayed on a display device, for example, as disclosed in Japanese Patent No. 3300334.

In addition, it is known in the art to perform viewpoint conversion processing on an image of the area surrounding a vehicle photographed by a camera installed at a predetermined position on a vehicle to generate a bird's-eye view image viewed from a virtual viewpoint thereabove (this bird's-eye view image will hereinafter be referred to as a "one-directional bird's-eye view image") and display the one-directional bird's-eye view image on a display device.

According to the vehicle-surroundings bird's-eye view image display technology and the one-directional bird's-eye view image display technology (which are hereinafter collectively referred to as "bird's-eye view image display technology"), a driver can prevent a collision and so on of the vehicle with obstacles located in the area surrounding the vehicle by recognizing the positional relationships between the vehicle and the obstacles shown in the vehicle-surroundings bird's-eye view image or the one-directional bird's-eye view image displayed on a display device in the vehicle.

In conventional bird's-eye view image display technology, the viewpoint conversion processing performed on the image or images captured by the camera by setting a projection plane at the height of a road surface in the vehicle's surroundings. Pixels of the captured image(s) are then projected onto the projection plane. Since the height of the road surface is used as a reference for the viewpoint conversion processing, a three-dimensional obstacle is displayed with a shape that falls away from the vehicle, as viewed from the camera, relative to a portion at which the obstacle makes contact with the ground. Since the absolute distance on the road surface between the vehicle and the obstacle is accurately expressed for three-dimensional obstacles disposed on the surface of the road, the bird's-eye view image gives the driver a somewhat correct sense of distance between the vehicle and the obstacle(s) in its surroundings.

However, when the obstacle in the vehicle surroundings is a three-dimensional object having a portion (hereinafter referred to as a "predicted contact portion") projecting toward the vehicle and disposed at a certain height above the road surface such that the predetermined contact portion may make contact with the vehicle before the portion of the object contacting the surface of the road when the vehicle moves toward the object, using conventional technology, the projection of an image of the predicted contact portion in a bird's-eye view results in the predicted contact portion being displayed at a distance that is farther from the vehicle than the actual distance between the vehicle and the predicted contact portion. Thus, problems exist in that when the vehicle moves toward the obstacle, the driver may have a sense of discomfort due to, for example, a sudden approach of the obstacle, or alternatively, the driver may not be able to perform a stopping operation in time to avoid colliding with the obstacle/object.

One example of an obstacle that may cause such problems is a clothes-drying pole. That is, when two stands disposed at opposite ends are not located in the direction the vehicle is moving, and a pole placed across the stands is located in the direction the vehicle is moving, the pole acts as the predicted contact portion of the obstacle that causes the above-described problems. Other examples of obstacles that cause the above-described problems include a three-dimensional object that has a shape extending substantially upward from the road surface and that bends or curves toward the vehicle. Another example includes an object having a shape that has a portion protruding toward the vehicle at a predetermined height on a wall located in the direction of movement of the vehicle. Obstacles causing such problems will hereinafter be referred to as "aerial obstacle(s)".

FIGS. 13A and 13B are schematic views illustrating the above-described problems of the related art. FIGS. 13A and 13B show the principle of how the predicted contact portion of an aerial obstacle is displayed at a position that is farther from the vehicle than the actual distance between the aerial obstacle and the vehicle. FIG. 13A shows the positional relationship between a vehicle 100 and an aerial obstacle 200 at a state in which the aerial obstacle 200 is projected on a road surface. FIG. 13B shows a one-directional bird's-eye view image generated by viewpoint conversion processing that projects an image onto the road surface.

A description of this case is given in an example in which a pole (e.g., a clothes-drying pole) is placed across two stands 201 and 202 exists behind the vehicle 100 as an aerial obstacle 200. As shown in FIG. 13A, the actual distance from the vehicle 100 to the aerial obstacle 200 is assumed to be D1. In this case, when the position of a camera 300 is used as a reference to project an image of the aerial obstacle 200 onto a projection plane that is set at the height of the road surface, the viewpoint of the image of the aerial obstacle 200 is converted into the viewpoint for a position at a distance of D2 (>D1) from the vehicle 100.

As a result, as shown in FIG. 13B, the image of the aerial obstacle 200 is displayed at a position D2 that is farther from the vehicle 100 than the actual distance D1. A dotted line shown in FIG. 13B indicates a guide line that is superimposed on the one-directional bird's-eye view image and is displayed at a predetermined distance (e.g., 50 cm) from the vehicle 100. In the example shown in FIGS. 13A and 13B, the aerial obstacle 200 exists at the same distance (D1=50 cm) as the position where the guide line is displayed. Thus, even though the guide line is displayed for the convenience of the driver, problems exist in that the driver is easily confused/misled since the position where the aerial obstacle 200 is displayed is erroneous.

SUMMARY OF THE INVENTION

An object of the present invention is to generate and display a bird's-eye view image that accurately expresses the distance between a vehicle and an aerial obstacle when the aerial obstacle exists in the surroundings of a vehicle.

In one aspect of the present invention, when an obstacle exists in the area surrounding the vehicle in the direction the image-capture-device is pointing and the obstacle has a predicted contact portion at a predetermined height above the road surface, the obstacle is determined to be an aerial obstacle, wherein the predicted contact portion is the portion of the obstacle with which the vehicle may make contact when the vehicle moves toward the aerial obstacle. When the aerial obstacle is detected, a virtual projection plane is set to a position at the height of the predicted contact portion of the aerial obstacle and viewpoint conversion processing is performed so as to project pixels of a captured image onto the virtual projection plane, thereby generating a bird's-eye view image.

According to another aspect of the present invention, with respect to a portion of an image within a range of distance from the vehicle to the predicted contact portion, viewpoint conversion processing is performed so as to project pixels of the portion of the image onto a projection plane set at a height of the road surface. Further, with respect to another portion of the image showing the range of the vehicle's surroundings that are located father from the vehicle than the predicted contact portion, viewpoint conversion processing is performed so as to project the pixels onto the virtual projection plane.

According to still another aspect of the present invention, once the obstacle is detected, if the vehicle is detected to have moved by an amount corresponding to an allowable-movement distance that is pre-stored in association with the height of the predicted contact portion of the detected obstacle, an operation mode is switched from a road-surface projection mode to a virtual-plane projection mode. In the road-surface projection mode, the viewpoint conversion processing is performed so as to project the pixels of the captured image onto a projection plane set at the height of the road surface, and in the virtual-plane projection mode, the viewpoint conversion processing is performed so as to project the pixels of the captured image onto the virtual projection plane.

When a vehicle surface on which the image capture device is installed has a protrusion/depression shape in the same direction in which the obstacle exists, the depression portion has an open space in the horizontal direction between the outer surface of the depression portion and the outer surface of the protrusion portion where the vehicle body does not exist. The horizontal distance (in the moving direction of the vehicle) between the outer surface of the depression portion and the outer surface of the protrusion portion may differ depending on the height from the road surface. This distance between the depression and protrusion portions is an allowable-movement distance, through which the vehicle may move without colliding with or contacting the predicted contact portion of the aerial obstacle.

According to another aspect, when a predicted contact portion that may contact with the vehicle exists at a predetermined height above the road surface, viewpoint conversion processing is performed so as to project the pixels of a captured image onto a projection surface set at the height of the predicted contact portion. Consequently, the height of the projection surface and the height of the predicted contact portion of the obstacle match each other, and the distance between the predicted contact portion and the vehicle is accurately expressed on the bird's-eye view image resulting from the viewpoint conversion. Thus, it is possible to obtain a bird's-eye view image that accurately expresses the distance between the vehicle and the predicted contact portion of the obstacle.

As described above, when the virtual projection surface is set at the height of the predicted contact portion of the obstacle to perform viewpoint conversion processing, the bird's-eye view image is generally compressed toward the image capture device (i.e., toward the vehicle) by an amount corresponding to the difference between the height of the projection surface and the road surface. In this manner, the compression effect can prevent the predicted contact portion from being erroneously expressed at a distance farther away from the vehicle than the actual distance. The portion of the image in the range from the vehicle to the predicted contact portion of the obstacle may also be compressed toward the vehicle.

Viewpoint conversion processing may be performed so as to project the pixels of the portion of the image in the range from the vehicle to the predicted contact portion of the obstacle onto the projection surface set at the height of the road. In this case, the portion of the image in this range is not compressed toward the vehicle by the viewpoint conversion processing. With this arrangement, when a white line (which is not a three-dimensional obstacle) is drawn on a road surface within the range from the vehicle to the predicted contact portion, a bird's-eye view image in which the white line appears closer to the vehicle is not erroneously obtained, and instead, the actual distance between the vehicle and the white line is accurately expressed on the bird's-eye view image resulting from the virtual conversion. On the other hand, the pixels of the portion of the image corresponding to a range between the predicted contact portion and the edge of the image located farthest from the vehicle (the "farther portion") are projected onto a virtual projection plane at the height of the predicted contact portion. In this way, the farther portion of the image is compressed, thereby accurately displaying the distance between the predicted contact portion and the vehicle. In this way, it is possible to obtain a bird's-eye view image that accurately expresses the distance between the vehicle and the white line that lies between the vehicle and the obstacle, as well as accurately express the distance between the vehicle and the predicted contact portion of the obstacle.

When the vehicle surface at which the image capture device is installed has a protrusion/depression shape in the direction in which the obstacle exists, the time at which the vehicle would make contact with the obstacle when the vehicle moves toward the obstacle may vary with the height of the predicted contact portion of the obstacle. That is, when the height of the protrusion portion of the vehicle and the height of the predicted contact portion of the obstacle do not mach each other, the time at which the vehicle would make contact with the obstacle may be delayed as compared to a case in which the heights match each other.

According to yet another aspect of the present invention, the timing of switching the operation mode from the road-surface projection mode to the virtual-plane projection mode may be delayed to the time at which the vehicle has moved by an amount corresponding to the allowable-movement distance after the obstacle is detected. That is, the operation mode does not have to switch to the virtual-plane projection mode immediately after the obstacle is detected. Since the allowable-movement distance is set based on the distance between the protrusion portion and the outer surface of the depression portion of the vehicle, a margin of distance (the "allowable-movement distance") is allowed before the vehicle would actually make contact with the obstacle, even if the timing of switching the operation mode to the virtual-plane projection mode is delayed. With this arrangement, the timing at which the image is compressed by the viewpoint conversion process using the virtual projection plane can be delayed as long as possible.

DESCRIPTION OF THE PREFERRED EMBODIMENTS

First Embodiment

Figure 1:
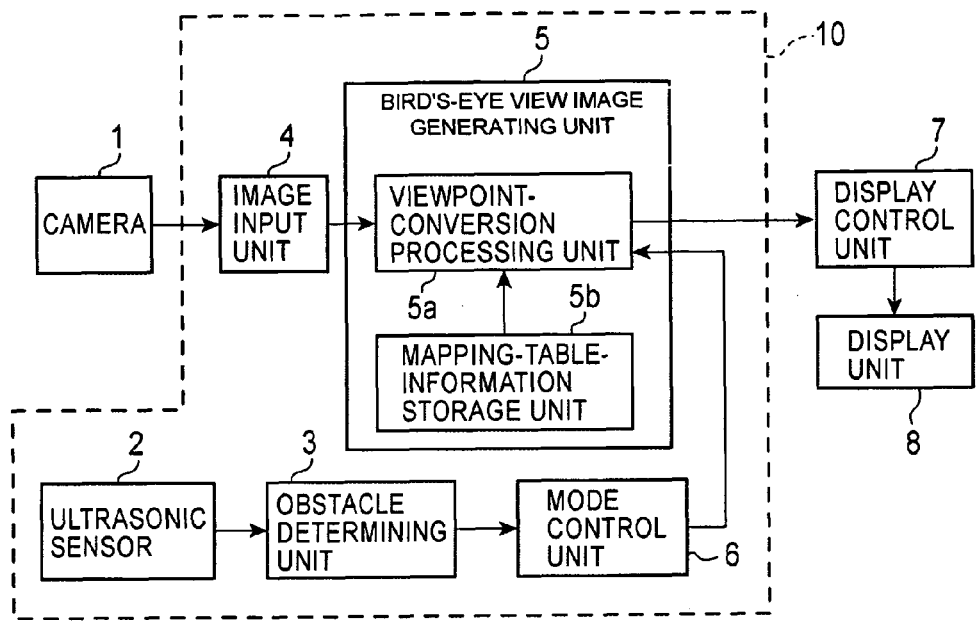
FIG. 1 is a block diagram showing an example of the configuration of a bird's-eye view image generating apparatus according to a first embodiment of the present invention.

A first embodiment of the present invention will be described below with reference to the accompanying drawings. FIG. 1 is a block diagram showing an example of the configuration of a bird's-eye view image generating apparatus 10 according to the first embodiment of the present invention. Referring to FIG. 1, a camera 1 is installed on a vehicle to photograph surroundings thereof. The camera 1 is disposed at a predetermined height, for example, on the surface of a rear portion of the vehicle to capture an image behind the vehicle. The camera 1 has, for example, a super-wide-angle lens such as a fisheye lens, and is capable of photographing a wide range behind the vehicle.

An ultrasonic sensor 2 detects the presence/absence of an obstacle in surroundings of the vehicle and also detects the distance from the vehicle to the obstacle based on a reflected wave of a transmitted ultrasonic wave. The ultrasonic sensor 2 has a sensor head that transmits the ultrasonic wave and receives an ultrasonic wave reflected by an obstacle. By measuring the time between the transmission and reception of the ultrasonic wave, the ultrasonic sensor 2 detects the position of the object. While the ultrasonic sensor 2 is used in this example, other sensors such as a millimeter-wave sensor may also be used.

When the ultrasonic sensor 2 detects an obstacle, an obstacle determining unit 3 determines whether or not the detected obstacle is an aerial object. The term "aerial obstacle" or "aerial object" as used herein refers to a three-dimensional obstacle or object that exists in the area surrounding the vehicle in a direction in which the camera is pointed (the "camera-installation direction") and that has a predicted contact portion disposed at a predetermined height above a surface of a road in the vehicle's surroundings. The predicted contact portion is the portion of the aerial obstacle with which the vehicle may make initial contact when the vehicle moves backward (toward the detected obstacle). The ultrasonic sensor 2 and the obstacle determining unit 3 constitute an obstacle detecting unit in this embodiment of the present invention.

Figure 2A:
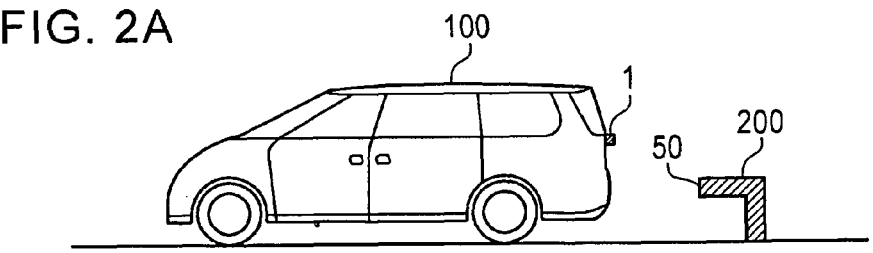
FIGS. 2A and 2B are schematic views each showing one example of an aerial obstacle having a predicted contact portion that exists at a predetermined height above a road surface.
Figure 2B:
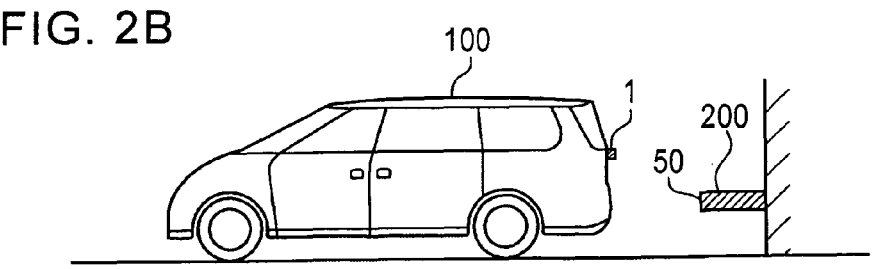

FIGS. 2A and 2B are schematic views each showing one example of an aerial obstacle 200 having a predicted contact portion 50 that exists at a certain height above a road surface. As shown in FIG. 2A, one possible example of the aerial object 200 is a three-dimensional object having a shape that extends substantially upward from the road surface and that then bends or curves toward the vehicle 100. As shown in FIG. 2B, another example of the aerial obstacle 200 is a three-dimensional object having a shape/portion that protrudes toward the vehicle 100 from a wall that is located in the direction the vehicle is moving (e.g., located behind the vehicle). Other examples of the aerial obstacle 200 include a clothes-drying pole and so on.

The ultrasonic sensor 2 transmits ultrasonic waves at various heights and detects the position of an object by measuring the time from the transmission of the ultrasonic waves to the reception of the reflected wave. When the object is an aerial obstacle 200, the time for the ultrasonic waves to be reflected by the predicted contact portion 50 is shorter than the time for the ultrasonic waves to be reflected by other portions of the object. Thus, when the ultrasonic sensor 2 detects a three-dimensional object having a predicted contact portion 50 that exists at a predetermined height above the road surface (i.e. the portion of the object that is determined to have the shortest distance as measured by the ultrasonic sensor 2), the obstacle determining unit 3 determines that the three-dimensional object is an aerial obstacle 200. At the same time, the obstacle determining unit 3 detects the height of the predicted contact portion 50 from the road surface.

The obstacle determining unit 3 further determines whether the detected height of the predicted contact portion 50 is greater or less than the height of the installation position of the camera 1. For example, the obstacle determining unit 3 stores the height of the camera 1 as known information, and compares the known height of the camera 1 with the height of the predicted contact portion 50 as detected by the object determining unit 3 to determine whether the height of the predicted contact portion 50 is greater or less than the height of the camera 1.

An image input unit 4 inputs an image of vehicle surroundings photographed by the camera 1 to the bird's-eye view image generating apparatus 10. A bird's-eye view image generating unit 5 converts the viewpoint of the image captured by the camera 1 and input by the image input unit 4 to generate a one-directional bird's-eye view image as viewed from a virtual viewpoint above the vehicle. The bird's-eye view image generating unit 5 includes a viewpoint-conversion processing unit 5a and a mapping-table-information storage unit 5b. The viewpoint-conversion processing unit 5a receives the image captured by the camera 1 from the image input unit 4. In accordance with mapping-table information (coordinate conversion information) stored in the mapping-table-information storage unit 5b, the viewpoint-conversion processing unit 5a generates a one-directional bird's-eye view image that is an image of the surroundings of the vehicle as viewed from above.

The mapping-table information stored in the mapping-table-information storage unit 5b contains information specifying relationships between the positions of the pixels of the image captured by the camera 1 and the positions of the pixels of a one-directional bird's-eye view image that is an image of the area surrounding the vehicle as viewed from above. For example, the mapping-table information may include coordinate conversion information indicating which pixel of the one-directional bird's-eye view image corresponds to which pixel of the captured image.

A mode control unit 6 controls an operation mode of the bird's-eye view image generating unit 5 in accordance with the result of the aerial obstacle 200 detection performed by the obstacle determining unit 3. The bird's-eye view image generating unit 5 has a road-surface projection mode and a virtual-plane projection mode. In the road-surface projection mode, the bird's-eye view image generating unit 5 performs viewpoint conversion processing so as to project the pixels of the image input by the image input unit 4 onto a projection plane set at the height of the road surface in the area surrounding the vehicle, and in the virtual-plane projection mode, the bird's-eye view image generating unit 5 performs viewpoint conversion processing so as to project the pixels of the image input by the image input unit 4 onto a virtual projection plane (described blow in detail).

When the obstacle determining unit 3 1) detects the aerial obstacle 200 behind the vehicle and 2) determines that the height of the predicted contact portion 50 of the aerial obstacle 200 is less than the height of the camera 1, the mode control unit 6 performs a control function so as to switch the operation mode from the road-surface projection mode to the virtual-plane projection mode. In other cases, for example, when an aerial obstacle 200 does not exist or when an aerial obstacle 200 exists but the height of the predicted contact portion 50 of the aerial obstacle 200 is greater than the height of the camera 1, the mode control unit 6 sets the bird's-eye view image generating unit 5 to the road-surface projection mode.

In the road-surface projection mode, the viewpoint-conversion processing unit 5a of the bird's-eye view image generating unit 5 sets the projection plane to the height of the road surface and performs viewpoint conversion processing so as to project the pixels of the image input by the image input unit 4 onto the road surface. The image generating unit 5 also generates a one-directional bird's-eye view image that is an image of the area surrounding the vehicle as viewed from a virtual viewpoint above the vehicle in the direction the camera 1 is pointing. More specifically, the mapping-table-information storage unit 5b stores a viewpoint-conversion mapping table that corresponds to the height of the road surface. The viewpoint-conversion processing unit 5a performs viewpoint conversion processing utilizing the viewpoint-conversion mapping table which uses the height of the road surface as the projection plane.

Figure 3A:
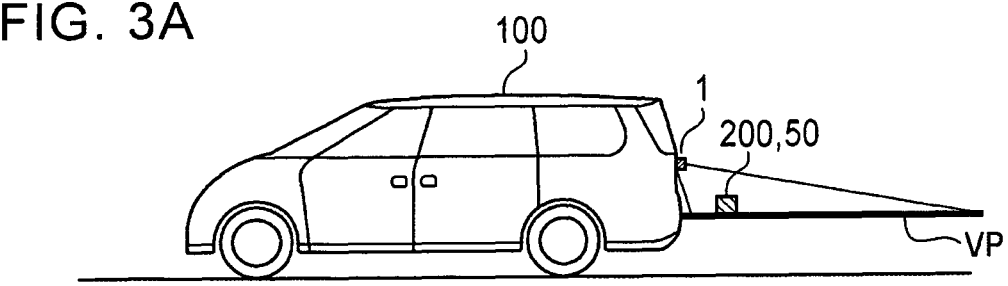
FIGS. 3A and 3B show a virtual projection plane set by a viewpoint-conversion processing unit of the first embodiment.
Figure 3B:
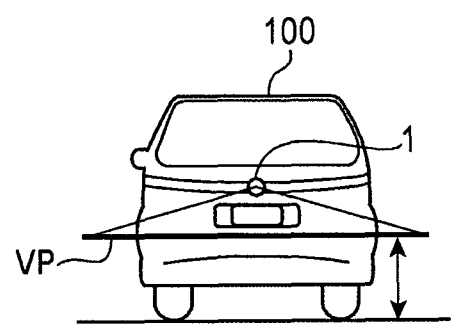

On the other hand, in the virtual-plane projection mode, as shown in FIGS. 3A and 3B, the viewpoint-conversion processing unit 5a in the bird's-eye view image generating unit 5 sets a virtual projection plane VP at a height where the predicted contact portion 50 of the aerial obstacle 200 exists, and performs viewpoint conversion processing so as to project the pixels of the image input by the image input unit 4 onto the virtual projection plane VP. By doing so, the viewpoint-conversion processing unit 5a generates a one-directional bird's-eye view image that is an image of the surroundings of the vehicle 100 viewed from a virtual viewpoint above the vehicle in the direction the camera 1 is pointing.

Specifically, the mapping-table-information storage unit 5b of the bird's-eye view image generating unit 5 stores multiple viewpoint-conversion mapping tables associated with multiple virtual projection planes VP having different heights above the road surface. The viewpoint-conversion processing unit 5a performs viewpoint conversion processing using the viewpoint-conversion mapping table associated with the viewpoint projection plane VP that corresponds to the height of the predicted contact portion 50 of the aerial obstacle 200 detected by the obstacle determining unit 3.

More specifically, the mapping-table-information storage unit 5b stores multiple viewpoint-conversion mapping tables associated with multiple virtual projection planes VP having different heights measured from the road surface, for example, in increments of 10 cm, e.g. heights of 10 cm, 20 cm, 30 cm, . . . , and so on from the road surface. The viewpoint-conversion processing unit 5a sets the virtual projection plane VP to the height of the predicted contact portion 50 detected by the obstacle determining unit 3, and performs viewpoint conversion processing using the viewpoint-conversion mapping table that corresponds to the virtual projection plane VP having a height that is the closest to the height of the set virtual projection plane VP.

When the obstacle determining unit 3 detects multiple aerial obstacles 200, the viewpoint-conversion processing unit 5a sets the virtual projection plane VP to a height where a predicted contact portion 50 that is the closest to the vehicle 100 exists, as measured from the vehicle 100 to the predicted contact portions 50 of the aerial obstacles 200. The viewpoint-conversion processing unit 5a then performs viewpoint conversion processing using the viewpoint-conversion mapping table that corresponds to a height that is the closest to the height of the set virtual projection plane VP.

Figure 4:
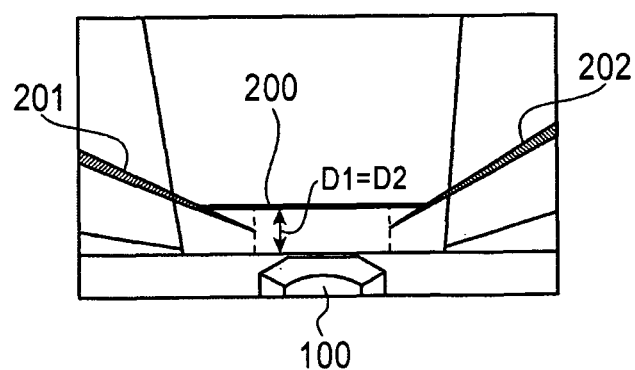
FIG. 4 shows one example of a one-directional bird's-eye view image generated by a bird's-eye view image generating unit of the first embodiment.

A display control unit 7 performs a control function for displaying the one-directional bird's-eye view image generated by the bird's-eye view image generating unit 5 on a display unit 8. FIG. 4 shows an example of the one-directional bird's-eye view image generated by the bird's-eye view image generating unit 5. In this example, a clothes-drying pole acting as an aerial obstacle 200 exists behind and 50 cm away from the vehicle 100, and a guide line (shown by a dotted line) is displayed superimposed at a position 50 cm from the vehicle 100 on the one-directional bird's-eye view image.

In the present embodiment, since the aerial obstacle 200 exists behind the vehicle 100, the viewpoint-conversion processing unit 5a sets the virtual projection plane VP to the height of the predicted contact portion 50 of the aerial obstacle 200. Viewpoint conversion processing is then performed so as to project the pixels of the captured image onto the set virtual projection plane VP such that the height of the projection plane and the height of the predicted contact portion 50 match each other. As a result, the distance between the predicted contact portion 50 and the vehicle 100 is accurately expressed on the one-directional bird's-eye view image resulting from the viewpoint conversion. In the example shown in FIG. 4, the guide line is displayed at the position 50 cm from the vehicle 100 such that the display position of the predicted contact portion 50 of the aerial obstacle 200 that exists behind, and 50 cm away from the vehicle 100 match each other completely.

Figure 5:
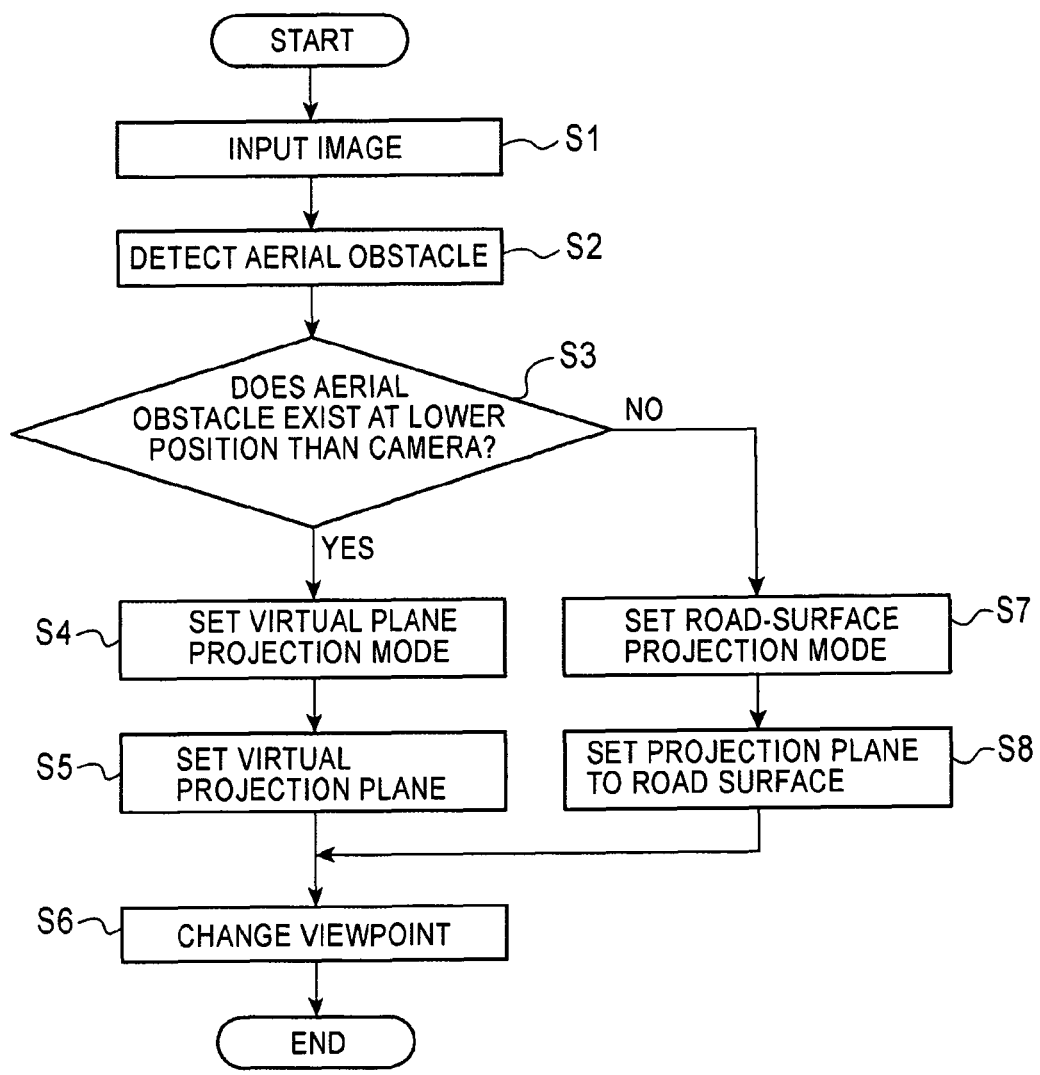
FIG. 5 is a flowchart showing an example of the operation of the bird's-eye view image generating apparatus according to the first embodiment.

The operation of the bird's-eye view image generating apparatus 10 according to the first embodiment will be described next. FIG. 5 is a flowchart showing an example of the operation of the bird's-eye view image generating apparatus 10 according to the first embodiment.

Referring to FIG. 5, first, the image input unit 4 inputs the image being captured by the camera 1 installed at the surface of the rear portion of the vehicle as an image of an area behind the vehicle (step S1). Next, the ultrasonic sensor 2 and the obstacle determining unit 3 detect an aerial obstacle 200 behind the vehicle (step S2). In this case, the obstacle determining unit 3 determines whether or not an aerial obstacle 200 exists behind the vehicle, and if so, the obstacle determining unit 3 detects and measures the height of the predicted contact portion 50 of the aerial obstacle 200.

Next, the mode control unit 6 determines whether or not the obstacle determining unit 3 has detected an aerial obstacle 200 having a predicted contact portion 50 that exists at a position that is lower than the camera 1 (step S3). Upon determining that the obstacle determining unit 3 has detected an aerial obstacle 200 having a predicted contact portion 50 that is lower than the height of the camera 1, the mode control unit 6 sets the bird's-eye view image generating unit 5 into the virtual-plane projection mode (step S4).

Upon setting of the virtual-plane projection mode, the viewpoint-conversion processing unit 5a of the bird's-eye view image generating unit 5 sets the virtual projection plane VP to the height of the predicted contact portion 50 that is the closest to the vehicle (step S5). The viewpoint-conversion processing unit 5a then performs viewpoint conversion processing so as to project the pixels of the image input in step S1 onto the virtual projection plane VP that was set in step S5, thereby generating a one-directional bird's-eye view image of the area behind the vehicle as viewed from a virtual viewpoint above the vehicle in the direction the camera 1 is pointing (step S6).

On the other hand, when the mode control unit 6 determines that the obstacle determining unit 3 has not detected an aerial obstacle 200 having a predicted contact portion 50 that is lower than the height of the camera 1 behind the vehicle, for example, when the obstacle determining unit 3 determines that no aerial obstacle 200 exists behind the vehicle, or when the obstacle determining unit 3 determines that an aerial obstacle 200 exists but the height of the predicted contact portion 50 thereof is greater than the height of the camera 1, the mode control unit 6 sets the bird's-eye view image generating unit 5 to the road-surface projection mode (step S7).

Upon setting of the road-surface projection mode, the viewpoint-conversion processing unit 5a in the bird's-eye view image generating unit 5 sets the projection plane to the height of the road surface (step S8). The viewpoint-conversion processing unit 5a then performs viewpoint conversion processing so as to project the pixels of the image input in step S1 onto the road surface (step S6) thereby generating a one-directional bird's-eye view image that is an image of the area behind the vehicle as viewed from a virtual viewpoint above the vehicle in the direction the camera 1 is pointing.

As described above in detail, according to the first embodiment, when an aerial obstacle 200 is detected in the vehicle's surroundings, the virtual projection plane VP is set to the height of the predicted contact portion 50 of the detected aerial obstacle 200 and performs viewpoint conversion processing so as to project the pixels of the image captured by the camera onto the virtual projection plane VP, thereby generating a one-directional bird's-eye view image. Consequently, the height of the projection plane and the height of the predicted contact portion 50 of the aerial obstacle 200 match each other, and the distance between the vehicle and the predicted contact portion 50 are accurately expressed on the one-directional bird's-eye view image. Thus, as shown in FIG. 4, it is possible to obtain a one-directional bird's-eye view image that accurately expresses the distance between the vehicle and the predicted contact portion 50 of the aerial obstacle 200.

Second Embodiment

Figure 6:
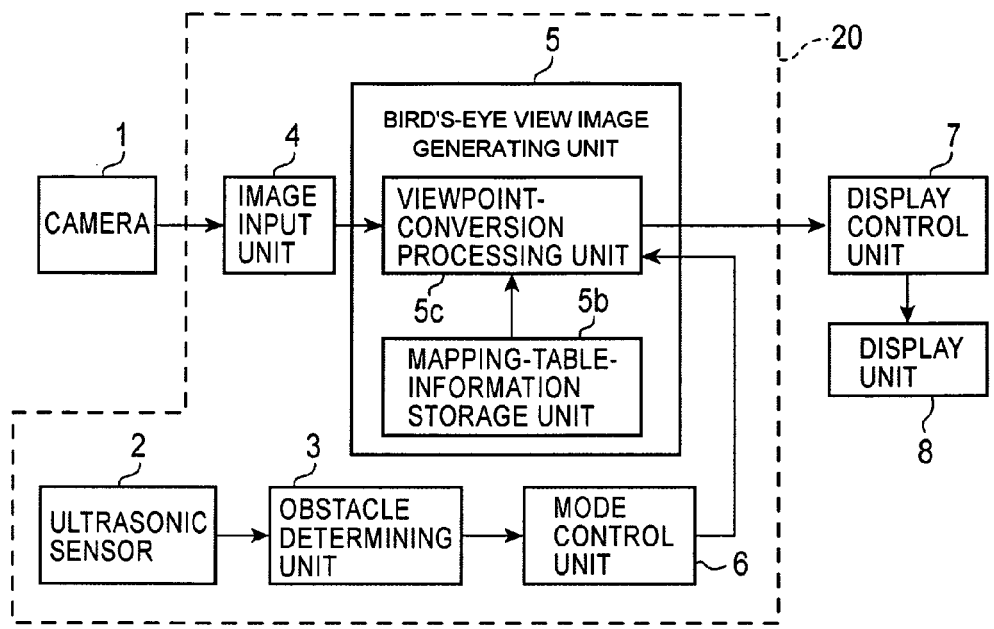
FIG. 6 is a block diagram showing an example of the configuration of a bird's-eye view image generating apparatus according to a second embodiment of the present invention.

Next, a second embodiment of the present invention will be described with reference to the accompanying drawings. FIG. 6 is a block diagram showing an example of the configuration of a bird's-eye view image generating apparatus 20 according to a second embodiment of the present invention. In FIG. 6, units denoted by the same reference numerals as those shown in FIG. 1 have the same functions, and thus the descriptions thereof will not be given below.

The second embodiment shown in FIG. 6 differs from the first embodiment shown in FIG. 1 in at least that a viewpoint-conversion processing unit 5c in the bird's-eye view image generating unit 5 performs a different type of processing than that performed by the viewpoint-conversion processing unit 5a of the first embodiment. That is, instead of the viewpoint-conversion processing unit 5a shown in FIG. 1, in the configuration in the second embodiment shown in FIG. 6 the viewpoint-conversion processing unit 5c performs a different type of processing.

With respect to a portion of an image captured by the camera that has a range of distance from the vehicle 100 to the predicted contact portion 50 of the aerial object 200 (the "nearer portion"), the viewpoint-conversion processing unit 5c performs viewpoint conversion processing so as to project the pixels of the nearer portion onto the road surface for the range of the image input by the image input unit 4 between the vehicle 100 and the predicted contact portion 50. That is, the viewpoint-conversion processing unit 5c performs viewpoint conversion processing using the viewpoint-conversion mapping table that uses the road surface as the projection plane. With respect to a portion of the image that extending beyond the range of distance between the vehicle to the predicted contact portion 50 (the "farther portion"), the viewpoint-conversion processing unit 5c performs a second viewpoint conversion processing whereby the pixels of the portion of the image extending from the predicted contact portion 50 to the outer edges of the image that are farthest from the vehicle 100 are projected onto the virtual projection plane VP. That is, the viewpoint-conversion processing unit 5c performs viewpoint conversion processing using the viewpoint-conversion mapping table that is associated with the virtual projection plane VP corresponding to the height of the predicted contact portion 50.

Figure 7:
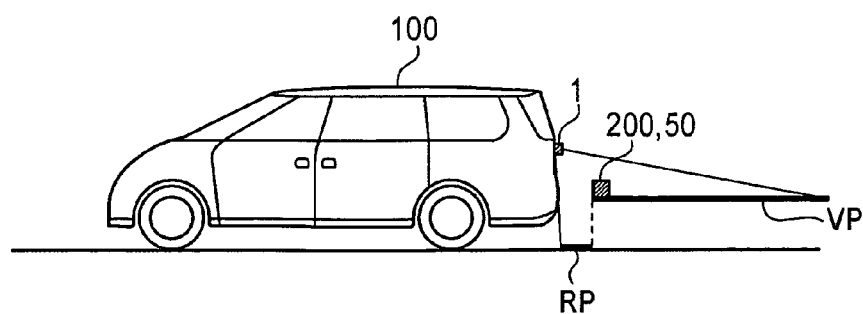
FIG. 7 is a schematic view showing a projection plane set by a viewpoint-conversion processing unit of the second embodiment.

FIG. 7 is a schematic view showing a projection plane according to the second embodiment. As shown in FIG. 7, when the obstacle determining unit 3 detects an aerial obstacle 200, the viewpoint-conversion processing unit 5c sets a projection plane RP to the road surface for a portion of the image corresponding to the area between the vehicle and the predicted contact portion 50 of the aerial obstacle 200 (the nearer portion), as viewed from the vehicle 100. The viewpoint-conversion processing unit 5c also sets a virtual projection plane VP for a portion of the image corresponding to an area that exists between the predicted contact portion 50 of the aerial obstacle 200 and the portion of the surrounding area captured by the camera that is farthest from the vehicle ("the farther area").

In the first embodiment, when the virtual projection plane VP is set to the height of the predicted contact portion 50 of the aerial obstacle 200 to perform viewpoint conversion processing on the entirety of the image captured by the camera, the resulting one-directional bird's-eye view image is generally compressed toward the camera 1 (toward the vehicle) by an amount substantially corresponding to the difference between the height of the set virtual projection plane and the road surface. As a result, an image portion located within the range from the vehicle to the predicted contact portion 50 of the aerial obstacle 200 (the image portion being an image of the nearer area as viewed from the vehicle) is also compressed toward the vehicle. In this case, for example, when a white line (which is not a three-dimensional obstacle) is drawn in on the image in the nearer portion (i.e. the white line is drawn between the vehicle and the predicted contact portion 50), a bird's-eye view image is obtained having the distance between the vehicle and the white line that appears shorter than the actual distance.

In contrast, according to the second embodiment, with respect to the nearer portion of the image, the viewpoint conversion processing is performed so as to project the pixels of the image onto a projection plane that is set to the height of the road surface. Thus, the nearer portion of the image is not compressed toward the vehicle. With this arrangement, for example, when a white line is drawn on a road surface within the range between the vehicle and the predicted contact portion 50, the white line does not appear closer to the vehicle than it actually is in the bird's-eye view image; rather, the actual distance between the vehicle and the white line is accurately expressed on the one-directional bird's-eye view image resulting from the virtual conversion. On the other hand, the pixels of the portion of the image between the predicted contact portion 50 of the aerial obstacle 200 and the outer edges of the image that are farthest from the vehicle 100 are projected onto the virtual projection plane VP, and are therefore compressed toward the vehicle 100 to accurately express the distance between the vehicle and the predicted contact portion 50. Thus, in the second embodiment, it is possible to obtain a one-directional bird's-eye view image that accurately expresses the distance between the vehicle and the white line disposed between the vehicle and the aerial obstacle 200, as well as the distance between the vehicle and the predicted contact portion 50 of the aerial obstacle 200.

Third Embodiment

Figure 8:
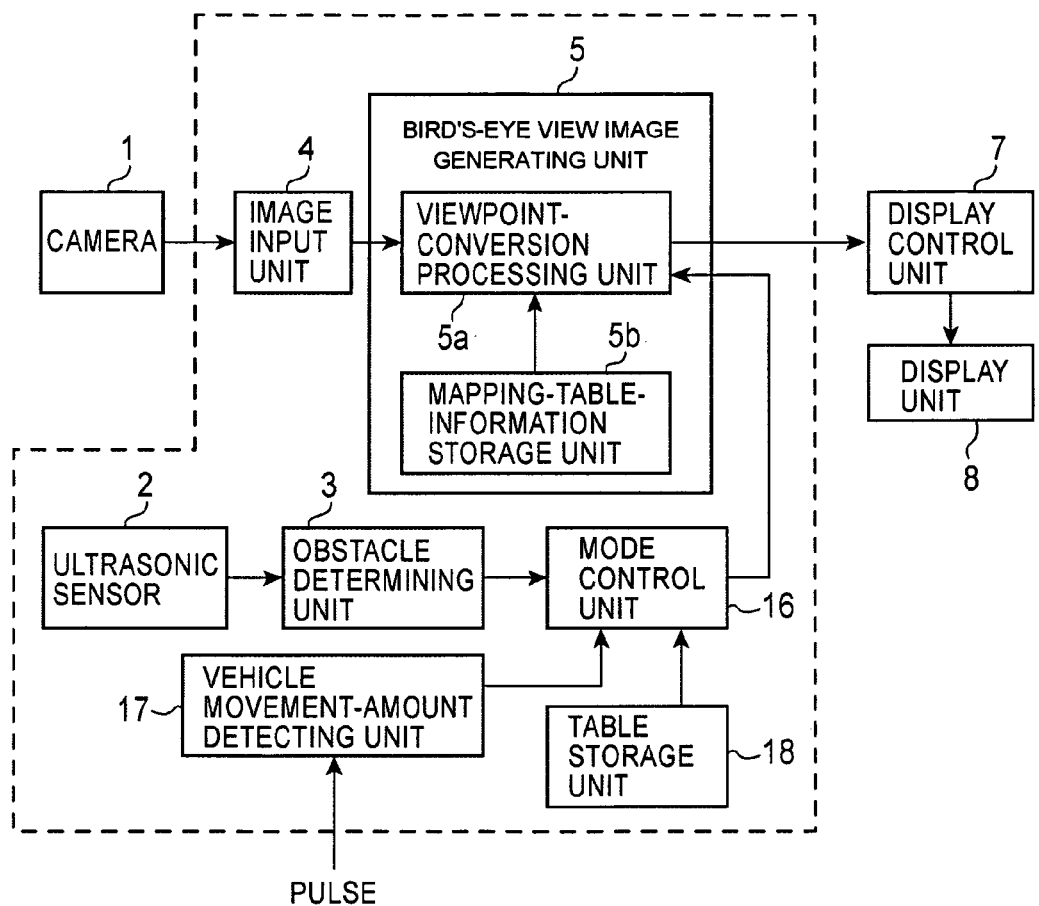
FIG. 8 is a block diagram showing an example of the configuration of a bird's-eye view image generating apparatus according to a third embodiment of the present invention.

Next, a third embodiment of the present invention will be described with reference to the accompanying drawings. FIG. 8 is a block diagram showing an example of the configuration of a bird's-eye view image generating apparatus 30 according to a third embodiment of the present invention. In FIG. 8, units denoted by the same reference numerals as those shown in FIG. 1 have the same functions, and thus the descriptions thereof will not be given below.

The third embodiment shown in FIG. 8 differs from the first embodiment shown in FIG. 1 in at least that a mode control unit 16 performs different processing from that performed by the mode control unit 6 in the first embodiment. That is, the configuration in the third embodiment shown in FIG. 8 includes a mode control unit 16 that performs different processing, as compared to the mode control unit 6 shown in FIG. 1. The third embodiment may have a configuration in which a vehicle movement-amount detecting unit 17 and a table storage unit 18 are added to the configuration shown in FIG. 1.

Figures 9, 10:
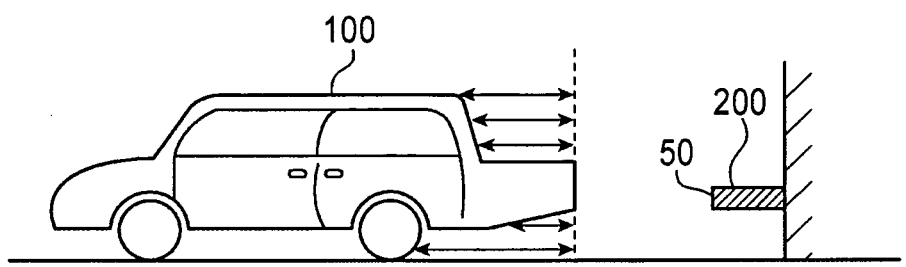
FIG. 9 is a schematic view illustrating an allowable-movement distance in the third embodiment.
FIG. 10 shows one example of a distance table stored in a table storage unit of the third embodiment.

More specifically, in the third embodiment, the surface of the rear-portion of the vehicle on which the camera 1 is installed has a protrusion/depression shape behind the vehicle (or in any direction in which an obstacle may exist), and the timing for switching the operation mode from the road-surface projection mode to the virtual-plane projection mode is varied from that in the first embodiment. For ease of description, a vehicle 100 in which the surface of the rear portion thereof has a shape that protrudes rearward, for example and as shown in FIG. 9, by an amount corresponding to the size of a trunk of the vehicle, will be discussed below. In this case, a depression portion is defined by a space where the vehicle body does not extend rearward to the same degree as the protrusion portion of the vehicle (e.g. the space above and below the trunk, or protrusion portion of a vehicle).

In the presence of such a depression portion, when the height of the protrusion portion and the height of the predicted contact portion 50 of an aerial obstacle 200 do not mach each other, an allowable margin of distance (the "allowable-movement distance") is determined in which the vehicle 100 may move rearward between the vehicle 100 and the predicted contact portion 50 before the vehicle 100 impacts the predicted contact portion. The allowable-movement distance is substantially the same as the horizontal length of the space of the depression portion. That is, the allowable-movement distance is substantially the distance between the rearmost (outermost) surface of the depression portion and the rearmost (outermost) surface of the protrusion portion of the vehicle 100 at any given height from the surface of the road. Depending on the shape of the vehicle, the horizontal dimension of the space may differ according to the height of the depression as measured from the road surface (see the horizontal arrows pointing forward and rearward, in FIG. 9).

Accordingly, the table storage unit 18 stores a distance table in which the heights of predicted contact portions 50 from the road surface and the allowable-movement distances of the vehicle 100 are associated with each other. That is, the table storage unit 18 stores the horizontal dimensions of the depression/protrusion space which are associated with the heights from the road surface as the allowable-movement distances. FIG. 10 shows an example of such a distance table. Information in the first row of the distance table shown in FIG. 10 indicates that when the predicted contact portion 50 exists at a height of 10 cm from the road surface, the allowable-movement distance is 50 cm larger than the allowable-movement distance when the predicted contact portion 50 exists at the height of the protrusion portion (e.g. the trunk), where the allowable-movement distance is zero (0). That is, because the rearmost surface of the depression portion is fifty (50) cm forward of the rearmost surface of the protrusion portion at a height of 10 cm, the vehicle 100 can move an additional fifty (50) cm in the direction of the predicted contact portion 50 before the vehicle 100 will collide with the predicted contact portion 50. However, it should be understood that when the distance between the vehicle 100 and the predicted contact portion 50 is smaller than the allowable-movement distance obtained by referring to the table storage unit 18, the distance between the vehicle 100 and the predicted contact portion 50 may be used as an allowable-movement distance instead of the obtained allowable-movement distance.

Similarly, information in the second row in the distance table indicates that the allowable-movement distance when the predicted contact portion 50 having a height of 20 cm from the road surface is 30 cm larger than the allowable-movement distance when the predicted contact portion 50 exists at the height of the protrusion portion, where the allowable-movement distance is zero (0). Information in the third to fifth rows of the distance table indicate that all allowable-movement distances for heights of 30 to 50 cm measured from the road surface are 0 cm, since the trunk that defines the protrusion portion exists at positions having heights of 30 to 50 cm.

In the example of the distance table shown in FIG. 10, it is assumed that the camera 1 is installed at the surface of the rear portion of the trunk at a height of 50 cm from the road surface. When the predicted contact portion 50 exists at a position higher than the position of the camera 1, the operation mode is not switched to the virtual-plane projection mode. Since the operation mode is not switched to the virtual-plane projection mode for heights greater than 50 cm and no allowable-movement distance exists for heights greater than or equal to 50 cm, preferably only the allowable-movement distances associated with heights of up to 50 cm are stored in the form of the distance table.

The vehicle movement-amount detecting unit 17 shown in FIG. 8 detects the amount of movement of the vehicle. For example, the vehicle equipped with the bird's-eye view image generating apparatus 30 is provided with a dead reckoning sensor. The dead reckoning sensor has a distance sensor for outputting a single pulse for each predetermined travel distance of the vehicle. The vehicle movement-amount detecting unit 17 sequentially receives the pulses output from the distance sensor, and detects the amount of movement of the vehicle based on the number of received pulses.

When the obstacle determining unit 3 detects an aerial obstacle 200 having a predicted contact portion 50 that exists at a position that is lower than the camera 1, the mode control unit 16 refers to the distance table stored in the table storage unit 18 in order to obtain the allowable-movement distance corresponding to the height of the predicted contact portion 50 detected by the obstacle determining unit 3. If the height of the predicted contact portion 50 and the height of the planes stored in the distance table do not match each other completely, the mode control unit 16 obtains the allowable-movement distance corresponding to a height that is the closest to the height of the predicted contact portion 50.

In addition, based on the amount of vehicle movement detected by the vehicle movement-amount detecting unit 17, the mode control unit 16 monitors whether or not the vehicle 100 has moved by an amount corresponding to the allowable-movement distance obtained from the distance table when the aerial obstacle 200 was detected. Upon detecting that the vehicle 100 has moved by an amount corresponding to the allowable-movement distance, the mode control unit 16 switches the operation mode from the road-surface projection mode to the virtual-plane projection mode.

Figure 11:
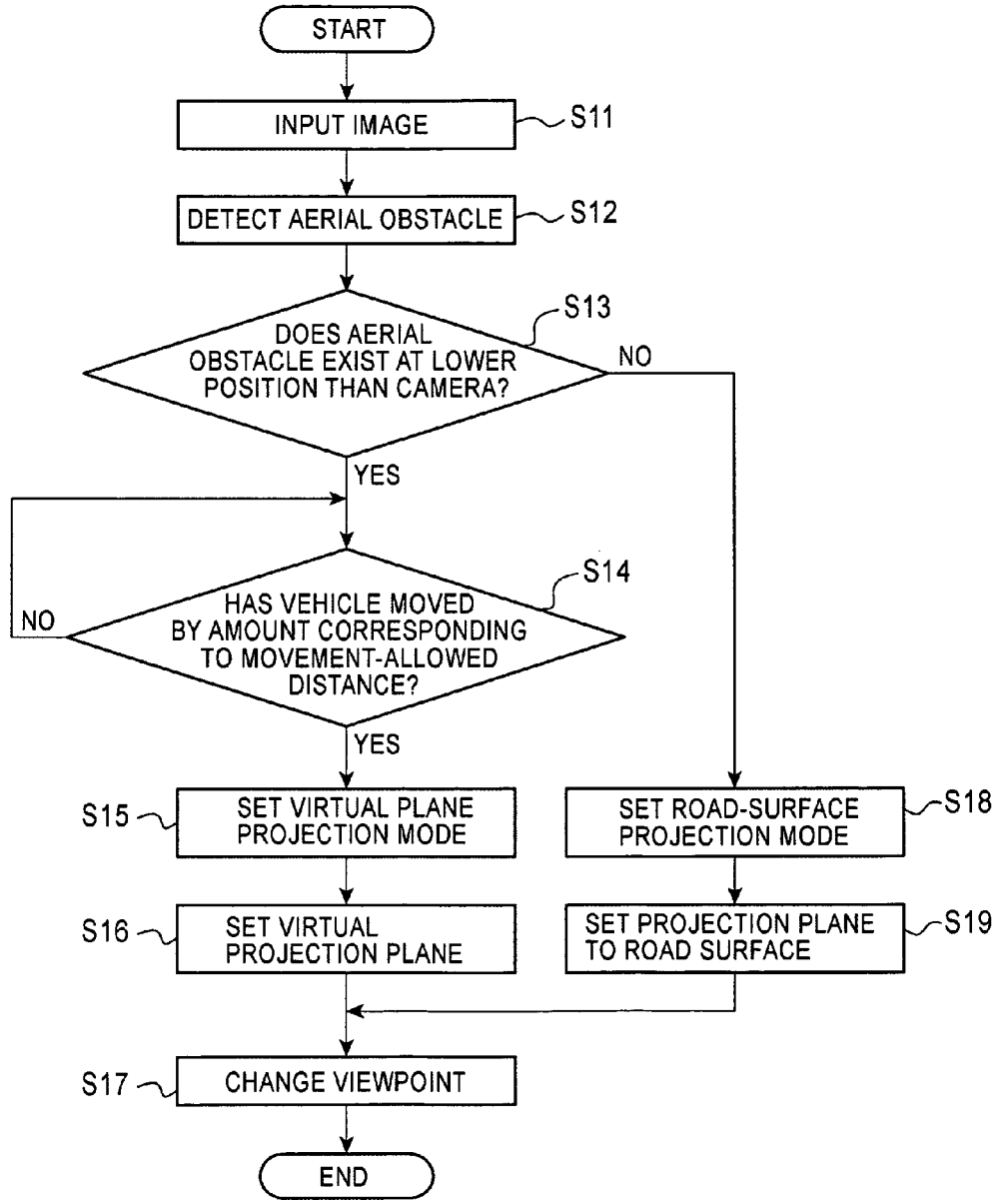
FIG. 11 is a flowchart showing an example of an operation of the bird's-eye view image generating apparatus according to the third embodiment.

The operation of the bird's-eye view image generating apparatus 30 according to the third embodiment configured as described above will be described next. FIG. 11 is a flowchart showing an example of the operation of the bird's-eye view image generating apparatus 30 according to the third embodiment.

Referring to FIG. 11, first, the image input unit 4 inputs an image of an area behind the vehicle (step S11), the image being captured by the camera 1 installed at the surface of the rear portion of the vehicle. Next, the ultrasonic sensor 2 and the obstacle determining unit 3 detect whether an aerial obstacle 200 exists behind the vehicle (step S12). In this case, if an aerial obstacle 200 exists behind the vehicle, the obstacle determining unit 3 detects the height of the predicted contact portion 50 of the aerial obstacle 200.

Next, the mode control unit 16 determines whether or not the obstacle determining unit 3 has detected an aerial obstacle 200 having a predicted contact portion 50 that exists at a position lower than the height of the camera 1 (step S13). Upon determining that the obstacle determining unit 3 has detected an aerial obstacle 200 having a predicted contact portion 50 that exists at a position lower than the height of the camera 1, the mode control unit 16 refers to the distance table stored in the table storage unit 18 to obtain the allowable-movement distance corresponding most closely to the height of the predicted contact portion 50. Based on the amount of vehicle movement detected by the vehicle movement-amount detecting unit 17, the mode control unit 16 determines whether or not the vehicle 100 has moved by an amount corresponding to the allowable-movement distance from when the aerial obstacle 200 was detected (step S114).

In this case, the mode control unit 16 repeats the determination processing in step S14, until it determines that the vehicle has moved by an amount corresponding to the allowable-movement distance. Upon determining that the vehicle has moved by an amount corresponding to the allowable-movement distance, the mode control unit 16 sets the bird's-eye view image generating unit 5 to the virtual-plane projection mode (step S15).

Upon setting the virtual-plane projection mode, the viewpoint-conversion processing unit 5a of the bird's-eye view image generating unit 5 sets the virtual projection plane VP to the height of the predicted contact portion 50 that is the closest to the vehicle (step S16). The viewpoint-conversion processing unit 5a then performs viewpoint conversion processing so as to project the pixels of the image input in step S11 onto the virtual projection plane VP set in step S16, thereby generating a one-directional bird's-eye view image that is an image of the area behind the vehicle as viewed from a virtual viewpoint above the vehicle in the direction the camera 1 is pointing (step S17).

On the other hand, when the mode control unit 16 determines that the obstacle determining unit 3 has not detected an aerial obstacle 200 having a predicted contact portion 50 that exists at a position lower than the height of the camera 1 behind the vehicle, e.g., when the obstacle determining unit 3 determines that no aerial obstacle 200 exists behind the vehicle, or when the obstacle determining unit 3 determines that an aerial obstacle 200 exists but the height of the predicted contact portion 50 is higher than the height of the camera 1, the mode control unit 16 sets the bird's-eye view image generating unit 5 to the road-surface projection mode (step S18).

Upon setting of the road-surface projection mode, the viewpoint-conversion processing unit 5a in the bird's-eye view image generating unit 5 sets the projection plane to the height of the road surface (step S19). The viewpoint-conversion processing unit 5a then performs viewpoint conversion processing so as to project the pixels of the image input in step S11 onto the road surface (step S17), thereby generating a one-directional bird's-eye view image that is an image of the area behind the vehicle viewed from a virtual viewpoint above the vehicle in the direction the camera 1 is pointing.

As described above in detail, according to the third embodiment, when the obstacle determining unit 3 detects an aerial obstacle 200 and the mode control unit 16 determines that the vehicle has moved by an amount corresponding to the allowable-movement distance for the height of the predicted contact portion 50 of the detected aerial obstacle 200, the mode control unit 16 switches the operation mode from the road-surface projection mode to the virtual-plane projection mode.

With this arrangement, the timing for switching the operation mode from the road-surface projection mode to the virtual-plane projection mode can be delayed until a time at which the vehicle has moved by an amount corresponding to the allowable-movement distance after the aerial obstacle 200 is detected; the operation mode does not switch to the virtual-plane projection mode immediately after the aerial obstacle 200 is detected. Since the allowable-movement distances are set according to the distance between the protrusion portion and the depression portion of the vehicle, a margin of distance is allowed before the vehicle would actually make contact with the predicted contact portion 50 of the aerial obstacle 200, even if the timing for switching the operation mode to the virtual-plane projection mode is delayed. With this arrangement, the time at which the image is compressed by the viewpoint conversion processing, which uses the set virtual projection plane VP, can be delayed as long as possible.

In an alternative embodiment, the viewpoint-conversion processing unit 5c shown in FIG. 6 may be used in the configuration shown in FIG. 8 instead of the viewpoint-conversion processing unit 5a.

Figure 12:
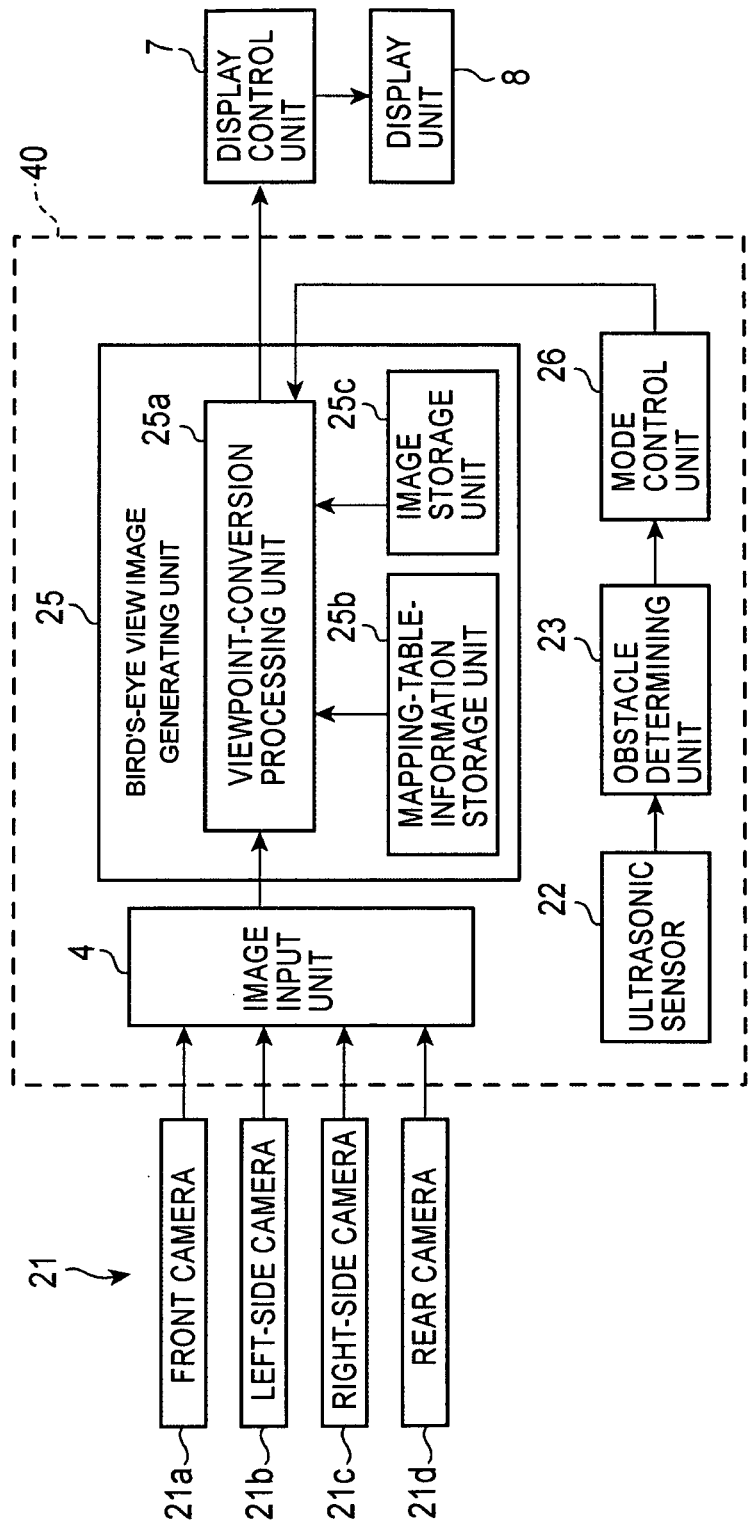
FIG. 12 is a block diagram showing an example of the configuration of a bird's-eye view image generating apparatus according to an embodiment of the present invention in which bird's-eye view image of the surrounding area of a vehicle is generated.
Figure 13A:
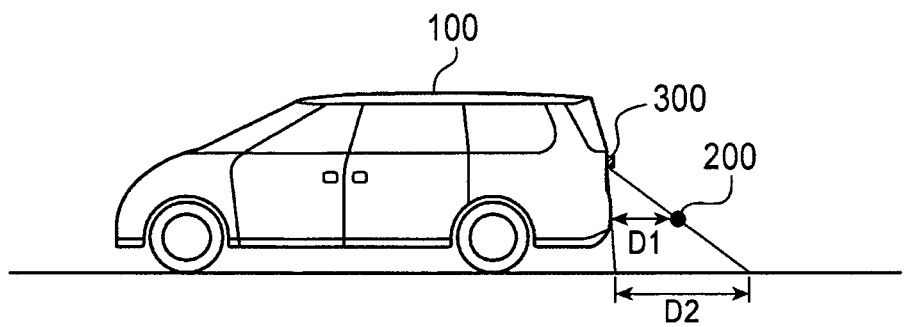
FIGS. 13A and 13B illustrate problems in the related art.
Figure 13B:
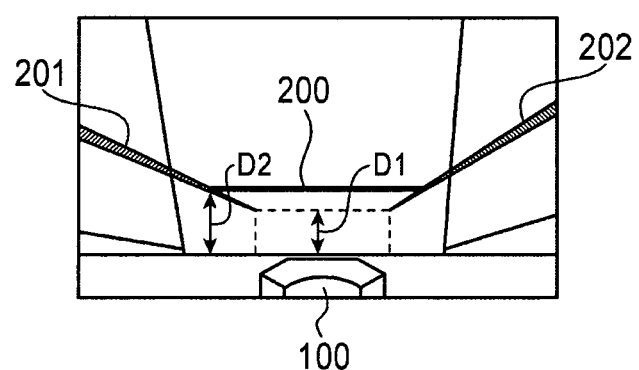

Although the descriptions in the first to third embodiments have been given of examples of a case in which a one-directional bird's-eye view image of the area behind a vehicle is generated based on an image captured by a single camera 1 installed at the rear portion of the vehicle, the present invention is not limited thereto. For example, the present invention is also applicable to a case in which a bird's-eye view image of a vehicle's surroundings is generated based on images captured by four or more cameras installed at front, rear, left, and right portions of a vehicle. FIG. 12 is a diagram showing an example of the configuration of a bird's-eye view image generating apparatus 40, which is one example of such a case. In FIG. 12, units denoted by the same reference numerals as those shown in FIG. 1 have the same functions, and thus the descriptions thereof will not be given below.

In FIG. 12, multiple cameras 21, for example, a front camera 21a, a left-side camera 21b, a right-side camera 21c, and a rear camera 21d, are installed at different positions of a vehicle in order to photograph the surroundings of the vehicle. The front camera 21a is disposed on a surface of a front portion of the vehicle to capture an image of an area in front of the vehicle. The left-side camera 21b is disposed on a left-side surface of the vehicle to capture an image of an area on the left side of the vehicle. The right-side camera 21c is disposed on a right-side surface of the vehicle to capture an image of an area on the right side of the vehicle. The rear camera 21d is disposed on the surface of a rear portion of the vehicle to capture an image of an area behind the vehicle.

Ultrasonic sensors 22, each having directionality in a predetermined range are provided at, for example, front, rear, left, and right portions of the vehicle. When the ultrasonic sensor 22 in one direction detects an obstacle, an obstacle determining unit 23 determines whether or not the detected obstacle is an aerial object 200. The obstacle determining unit 23 also detects the distance from the vehicle to the aerial obstacle 200 and the height of the predicted contact portion 50 thereof. The obstacle determining unit 23 further determines whether the detected height of the predicted contact portion 50 is greater than or less than the height of the installation position of the camera 21.

A viewpoint-conversion processing unit 25 converts the viewpoints of the images of the vehicle surroundings captured by the cameras 21a to 21d, and combines the converted viewpoint images to generate a bird's-eye view image of the vehicle's surroundings as viewed from a virtual viewpoint above the vehicle. The viewpoint-conversion processing unit 25 includes a viewpoint-conversion processing unit 25a, a mapping-table-information storage unit 25b, and an image storage unit 25c.

The viewpoint-conversion processing unit 25a receives the images, captured by the cameras 21a to 21d, from the image input unit 4. In accordance with mapping-table information (coordinate conversion information) stored in the mapping-table-information storage unit 25b, the viewpoint conversion processing unit 25a generates a background image of the vehicle's surroundings as viewed from above the vehicle. The background image is generated based on the images of the vehicle's surroundings captured by the cameras 21a to 21d installed on the vehicle. Thus, the background image contains only the actual background and any obstacle(s) disposed therein; the images preferably do not contain an image of the vehicle.

The viewpoint-conversion processing unit 25a reads vehicle-image data representing an image of the vehicle as viewed from above from the image storage unit 25c, and superimposes the image of the vehicle on a predetermined position of the background image (e.g., on a center position where a vehicle is located in the background image). This processing generates a bird's-eye view image of the vehicle's surroundings in which the background image and the vehicle image are combined.

The mapping-table information stored in the mapping-table-information storage unit 25b contains information specifying relationships between the positions of the pixels of images captured by the cameras 21a to 21d and the positions of the pixels of the image of the surroundings of the vehicle as viewed from above the vehicle (the "background image"). That is, coordinate conversion information indicating which pixel of the background image corresponds to which pixel of the images captured by the cameras. The image storage unit 25c stores vehicle image data representing an image of the vehicle viewed from thereabove. The viewpoint-conversion processing unit 25a reads the vehicle image data from the image storage unit 25c as needed.

The mapping-table-information storage unit 25b stores a viewpoint-conversion mapping table corresponding to the height of the road surface and multiple viewpoint-conversion mapping tables associated with virtual projection planes VP having different heights above the road surface. While the operation mode is set in the road-surface projection mode, the viewpoint-conversion processing unit 25a performs viewpoint conversion processing by using the viewpoint-conversion mapping table corresponding to the height of the road surface. On the other hand, when the operation mode is set in the virtual-plane projection mode, the viewpoint-conversion processing unit 25a performs viewpoint conversion processing using the viewpoint-conversion mapping table associated with the viewpoint projection plane VP that corresponds to the height of the predicted contact portion 50 of the aerial obstacle 200 detected by the obstacle determining unit 23.

When the obstacle determining unit 23 detects an aerial obstacle 200 in one or more of front, rear, left, or right directions and also determines that the height of the predicted contact portion 50 of the aerial obstacle 200 is less than the height of the corresponding one of the cameras 21a to 21d, the mode control unit 26 performs a control function so as to switch the operation mode from the road-surface projection mode to the virtual-plane projection mode.

For example, when the obstacle determining unit 23 detects an aerial obstacle 200 in front of the vehicle and determines that the height of the predicted contact portion 50 of the aerial obstacle 200 is less than the height of the front camera 21a, the mode control unit 26 switches the operation mode from the road-surface projection mode to the virtual-plane projection mode for the image captured by the front camera 21a. If no aerial obstacle 200 exists in directions other than the front direction, or when an aerial obstacle 200 exists in the right side, left side, or to the rear of the vehicle, but the height of the predicted contact portion 50 of the aerial obstacle 200 is greater than the height of the respective cameras 21b to 21d, the mode control unit 26 maintains the road-surface projection mode with respect to images captured by the left-side camera 21b, the right-side camera 21c, and the rear camera 21d.

If the virtual-plane projection mode is set for only the image captured in a direction in which the aerial obstacle 200 is detected, only the background image in that direction is compressed toward the vehicle. Alternatively, the arrangement may be such that, when an aerial obstacle 200 is detected in at least one direction of the front, rear, left, and/or right directions, the operation mode is switched from the road-surface projection mode to the virtual-plane projection mode with respect to images captured in all directions.

In the third embodiment, even if the allowable-movement distance obtained by referring to the table storage unit 18 is, for example, fifty (50) cm, when the distance (the horizontal length of the protrusion portion) between the predicted contact portion 50 of an aerial obstacle 200 and a wall is smaller than 50 cm the actual allowable-movement distance is less than 50 cm, as shown in FIG. 9. The distance between the predicted contact portion 50 and the wall can be detected by the ultrasonic sensor 2. Thus, when the distance between the vehicle 100 and the predicted contact portion 50 is smaller than the allowable-movement distance obtained by referring to the table storage unit 18, the distance between the vehicle 100 and the predicted contact portion 50 may be used as an allowable-movement distance instead of the obtained allowable-movement distance.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A bird's-eye view image generating apparatus method comprising:
    inputting an image of an area surrounding a vehicle photographed by an image capture device installed on the vehicle;
    detecting when an obstacle that exists in the area surrounding the vehicle in a direction the image-capture device is pointed, the obstacle having a predicted contact portion at a predetermined height above a surface of a road that is captured in the image of the surroundings of the vehicle, the predicted contact portion being a portion of the obstacle which will make initial contact with the vehicle when the vehicle moves toward the obstacle;
    setting, when the obstacle is detected, a virtual projection plane at the height above the surface of the road where the predicted contact portion is detected, and performing viewpoint conversion processing in which pixels of the image are projected onto the virtual projection plane, thereby generating a bird's-eye view image that is an image of the area surrounding the vehicle in the direction the image capture device is pointed as viewed from a virtual viewpoint above the vehicle that accurately reflects the distance between the vehicle and the predicted contact portion of the obstacle;
    detecting an amount of movement of the vehicle; and,
    switching an operation mode from a road-surface projection mode to a virtual-plane projection mode when 1) the obstacle is detected and 2) it is determined that, based on the detected amount of movement of the vehicle, that the vehicle has moved by an amount corresponding to an allowable-movement distance stored in a distance table in which a height of the predicted contact portion of the obstacle and an allowable-movement distance for the vehicle are associated with each other;
    wherein in the road-surface projection mode, the viewpoint conversion processing is performed so as to project the pixels of the image onto a projection plane set at a height of the road surface in the vehicle surroundings, and in the virtual-plane projection mode, the viewpoint conversion processing is performed so as to project the pixels of the image onto the virtual projection plane.

2. The bird's-eye view image generating method according to claim 1, wherein the captured image is modified in the direction toward the vehicle based on a difference between the height of the virtual projection plane and the surface of the road to accurately reflect the distance between the vehicle and the predicted contact portion of the obstacle.

3. The bird's-eye view image generating method according to claim 1, further comprising a plurality of viewpoint-conversion mapping tables associated with a plurality of virtual projection planes, each virtual projection plane having a different height from the road surface, and wherein the viewpoint conversion processing is performed using the viewpoint-conversion mapping table associated with the virtual projection plane that most closely corresponds to the height of the predicted contact portion of the detected obstacle.

4. The bird's-eye view image generating method according to claim 3, further comprising detecting a distance from the vehicle to the predicted contact portion of the obstacle, and 1) performing a first viewpoint conversion processing on a first portion of the image by using a viewpoint-conversion mapping table that sets the road surface as a projection plane, the first portion of the image having a range between the vehicle and the predicted contact portion of the obstacle, and 2) performing a second viewpoint conversion processing on a second portion of the image by using the viewpoint-conversion mapping table associated with the virtual projection plane most closely corresponding to the height of the predicted contact portion of the detected obstacle, the second portion of the image having a range between the predicted contact portion of the obstacle and an outer edge of the image capturing the surrounding area disposed farthest from the vehicle.

5. The bird's-eye view image generating method according to claim 1, wherein, when a plurality of obstacles are detected, distances from the vehicle to each of the respective predicted contact portions of the obstacles are detected, and the virtual projection plane is set to a position at a height of the predicted contact portion of the obstacle that is the closest in proximity to the vehicle.

6. The bird's-eye view image generating method according to claim 1, including a plurality of image capture devices disposed at different locations on the vehicle such that said image capture devices capture images of the front, rear, left side, and right side areas surrounding the vehicle.

7. The bird's-eye view image generating method according to claim 6, wherein the viewpoint conversion processing for images captured by each image capture device is performed when an obstacle is detected in the respective images.

8. A bird's-eye view image generating method comprising:
inputting an image of an area surrounding a vehicle captured by an image capture device installed on the vehicle;
detecting when an obstacle exists in the area surrounding the vehicle in a direction of the image-capture-device is pointed, the obstacle having a predicted contact portion at a predetermined height above a road surface, wherein the predicted contact portion is a portion with which the vehicle may make contact when the vehicle moves toward the object;
setting, when the obstacle is detected, a virtual projection plane to a height where the predicted contact portion of the obstacle exists;
performing viewpoint conversion processing so as to project pixels of the input image onto the virtual projection plane, thereby generating a bird's-eye view image that is an image of the area surrounding the vehicle as viewed from a virtual viewpoint above the vehicle in a direction of the image capture device; and,
detecting an amount of movement of the vehicle after the obstacle is detected, and if the vehicle has been detected to have moved by an amount corresponding to an allowable-movement distance stored by a table storage unit in association with a height of the predicted contact portion, an operation mode is switched from a road-surface projection mode to a virtual-plane projection mode to perform the viewpoint conversion processing, wherein in the road-surface projection mode, the viewpoint conversion processing is performed so as to project the pixels of the image captured by the image capture device onto a projection plane set at a height of the road surface in the vehicle surroundings, and in the virtual-plane projection mode, the viewpoint conversion processing is performed so as to project the pixels of the image captured by the image capture device onto the virtual projection plane.

9. The bird's-eye view image generating method according to claim 8, wherein a distance from the vehicle to the predicted contact portion of the obstacle is detected, and wherein the viewpoint conversion processing is performed by performing a first viewpoint conversion processing on a first portion of the image having a range between the vehicle and the detected distance from the vehicle to the predicted contact portion of the obstacle, the first viewpoint conversion processing using the road surface as a projection plane, and performing a second viewpoint conversion processing on a second portion of the image having a range between the predicted contact portion of the obstacle and the outer edge of the image disposed farthest from the vehicle, the second viewpoint conversion processing using the virtual projection plane as the projection plane.

10. The bird's-eye view image generating method according to claim 8, wherein, when the obstacle is detected, an operation mode is switched from a road-surface projection mode to a virtual-plane projection mode, wherein in the road-surface projection mode, the viewpoint conversion processing is performed so as to project the pixels of the image captured by the image capture device onto a projection plane set at a height of the road surface in the vehicle surroundings, and in the virtual-plane projection mode, the viewpoint conversion processing is performed so as to project the pixels of the image captured by the image capture device onto the virtual projection plane.

11. A bird's-eye view image generating method comprising:
inputting an image of an area surrounding a vehicle photographed by an image capture device installed on the vehicle, the vehicle comprising a protruding portion that extends away from the vehicle as compared to a non-protruding portion of the vehicle;
detecting an obstacle that exists in the area surrounding the vehicle in a direction the image-capture device is pointed, the obstacle having a predicted contact portion at a predetermined height above a surface of a road captured in the image of the surroundings of the vehicle, the predicted contact portion being a portion of the obstacle which will make initial contact with the vehicle when the vehicle moves toward the obstacle;
setting, when the obstacle is detected, a virtual projection plane at the height above the surface of the road where the predicted contact portion is detected, and performing viewpoint conversion processing;
detecting an amount of movement of the vehicle; and
switching an operation mode from a road-surface projection mode to a virtual-plane projection mode 1) the obstacle is detected and 2) it is determined that, based on the detected amount of movement of the vehicle, that the vehicle has moved by an amount corresponding to an allowable-movement distance stored by a table storage unit that stores data in a distance table in which a height of the predicted contact portion of the obstacle and the allowable-movement distance for the vehicle are associated with each other, the allowable-movement distance for the vehicle corresponding to the distance the protruding portion extends away from the non-protruding portion of the vehicle at the height of the predicted contact portion of the obstacle,
wherein in the road-surface projection mode, the viewpoint conversion processing is performed so as to project the pixels of the image onto a projection plane set at a height of the road surface in the vehicle surroundings, and in the virtual-plane projection mode, the viewpoint conversion processing is performed so as to project the pixels of the image onto the virtual projection plane, thereby altering the image to accurately reflect the distance between the vehicle and the predicted contact portion of the obstacle.

12. The bird's-eye view image generating method according to claim 11, wherein the operation mode switches from the road-surface projection mode to the virtual-plane projection mode when the vehicle has moved by an amount based on the allowable-movement distance after the obstacle is detected.

13. The bird's-eye view image generating method according to claim 11, wherein the captured image is modified in the direction toward the vehicle based on a difference between the height of the virtual projection plane and the surface of the road to accurately reflect the distance between the vehicle and the predicted contact portion of the obstacle.

14. The bird's-eye view image generating method according to claim 11, wherein, when a plurality of obstacles are detected, distances from the vehicle to each of the respective predicted contact portions of the obstacles are detected, the virtual projection plane is set to a position at a height of the predicted contact portion of the obstacle that is the closest in proximity to the vehicle.

15. The bird's-eye view image generating method according to claim 11, wherein the image capture device includes a plurality of image capture devices disposed at different locations on the vehicle such that the image capture devices capture images of the front, rear, left side, and right side areas surrounding the vehicle, and the viewpoint conversion processing is performed for images captured by each image capture device when the obstacle is detected in the images.

16. The bird's-eye view image generating method according to claim 11, further comprising a plurality of viewpoint-conversion mapping tables associated with a plurality of virtual projection planes, each virtual projection plane having a different height from the road surface, and wherein the viewpoint conversion processing is performed using the viewpoint-conversion mapping table associated with the virtual projection plane that most closely corresponds to the height of the predicted contact portion of the detected obstacle.

17. The bird's-eye view image generating method according to claim 16, wherein a distance is detected from the vehicle to the predicted contact portion of the obstacle, and 1) a first viewpoint conversion processing is performed on a first portion of the image captured by the image capture device by using a viewpoint-conversion mapping table that sets the road surface as a projection plane, the first portion of the image having a range between the vehicle and the predicted contact portion of the obstacle, and 2) a second viewpoint conversion processing is performed on a second portion of the image captured by the image capture device by using the viewpoint-conversion mapping table associated with the virtual projection plane most closely corresponding to the height of the predicted contact portion of the obstacle detected by the obstacle detecting unit, the second portion of the image having a range between the predicted contact portion of the obstacle and an outer edge of the image capturing the surrounding area disposed farthest from the vehicle.

* * * * *